(12) United States Patent
Nakase et al.

(10) Patent No.: US 10,296,153 B2
(45) Date of Patent: May 21, 2019

(54) ELECTROSTATIC CAPACITANCE TOUCH PANEL (71) Applicant: SMK Corporation, Tokyo (JP)

(72) Inventors: Takayuki Nakase, Toyama (JP); Haruka Imai, Kanagawa (JP)

(73) Assignee: SMK Corporation, Tokyo (JP)

(*) Notice: Subject to any disclaimer, the term of this patent is extended or adjusted under 35 U.S.C. 154(b) by 0 days.

(21) Appl. No.: 15/823,588

(22) Filed: Nov. 28, 2017

(65) Prior Publication Data
US 2018/0284921 A1 Oct. 4, 2018

(30) Foreign Application Priority Data

Mar. 30, 2017 (JP) .................................. 2017-67214

(51) Int. Cl.
G06F 3/041 (2006.01)
G06F 3/044 (2006.01)

(52) U.S. Cl.
CPC ............ *G06F 3/044* (2013.01); *G06F 3/0418* (2013.01); *G06F 2203/04103* (2013.01); *G06F 2203/04107* (2013.01); *G06F 2203/04111* (2013.01); *G06F 2203/04112* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0231298 A1* | 9/2009 | Yang | ........................ | G06F 3/044 345/173 |
| 2009/0315854 A1* | 12/2009 | Matsuo | ................. | G06F 3/0412 345/174 |
| 2009/0322704 A1* | 12/2009 | Anno | ........................ | G06F 3/044 345/174 |
| 2016/0202789 A1* | 7/2016 | Kim | ........................ | G06F 3/044 345/174 |
| 2017/0108964 A1* | 4/2017 | Sato | ........................ | G06F 3/044 |
| 2017/0344162 A1* | 11/2017 | Lee | ........................ | G06F 3/0412 |

OTHER PUBLICATIONS

Office Action issued for counterpart Japanese Application 2017-067214, issued by the Japan Patent Office dated Apr. 24, 2018.

* cited by examiner

Primary Examiner — Priyank J Shah (57) ABSTRACT

Provided is an electrostatic capacitance touch panel with high manufacturing yield that can significantly decrease occurrence of defective product due to short circuit as compared with related art even if there is short circuit between a dummy pattern and an electrode included in an insulated area with wide width recognized as distinct from the electrode. Several first electrodes 20, several second electrodes 30, and a dummy pattern 50 made from the same material as or a material with the same refractive index as the electrode provided in an insulated area 40 between the adjacent first electrode 20 and the second electrode 30 are provided over the same surface of an insulating substrate 10. The dummy pattern 50 is segmented in the long direction of the insulated area.

3 Claims, 11 Drawing Sheets

| PATTERN | REFERENCE VALUE AT SHORT CIRCUIT LOCATION ※1 | | | | DETERMINATION OF DIFFERENCE ※2 |
|---|---|---|---|---|---|
| | (X1,Y1) | (X1,Y14) | (X26,Y1) | (X26,Y14) | |
| A | 26740 (2.4σ) | 26348 (0.2σ) | 26549 (1.4σ) | 26308 (0.0σ) | NO |
| B | 27003 (3.4σ) | 26520 (0.9σ) | 26876 (2.8σ) | 26609 (1.4σ) | NO |
| C | 27189 (3.4σ) | 26682 (0.8σ) | 27072 (2.8σ) | 26835 (1.6σ) | NO |
| D | 27494 (4.9σ) | 27004 (2.2σ) | 27256 (3.6σ) | 27036 (2.4σ) | NO |
| E | 28512 (11.2σ) | 27970 (8.4σ) | 28087 (9.0σ) | 27841 (7.7σ) | YES |
| F | 28699 (12.2σ) | 28137 (8.9σ) | 28396 (10.4σ) | 28058 (8.5σ) | YES |
| G | 30493 (21.7σ) | 29796 (17.8σ) | 30305 (20.7σ) | 29803 (17.8σ) | YES |
| H | 32752 (32.5σ) | 32574 (31.5σ) | 32752 (32.5σ) | 32394 (30.6σ) | YES |
| I | 27917 (8.0σ) | 27401 (5.0σ) | 27559 (5.9σ) | 27400 (5.0σ) | YES |
| J | 27014 (2.3σ) | 26562 (-0.2σ) | 26726 (0.7σ) | 26550 (2.4σ) | NO |

*1 THE VALUE IN () IS CALCULATED BY THE FOLLOWING FORMULA $$\frac{\text{REFERENCE VALUE AT SHORT CIRCUIT LOCATION} - \text{IN-PLANE MEAN VALUE}}{\text{IN-PLANE STANDARD DEVIATION } \sigma}$$

*2 PANEL WITH 6σ OR MORE IS DETERMINED AS THERE IS DIFFERENCE.

*FIG. 6*

| PATTERN | | A | B | C | D | E | F | G | H | I | J |
|---|---|---|---|---|---|---|---|---|---|---|---|
| ACCURACY | DISPERSION | 0.072 | 0.092 | 0.105 | 0.095 | 0.074 | 0.085 | 0.068 | 0.603 | 0.080 | 0.085 |
| | DISPERSION RATIO F0 | 1.183 | 1.084 | 1.234 | 1.122 | 1.149 | 1.002 | 1.252 | 7.096 | 1.064 | – |
| | t0 | 1.178 | 0.073 | 1.129 | 0.218 | 0.838 | 0.742 | 0.556 | 7.065 | 0.378 | – |
| SENSITIVITY | DISPERSION | 215.020 | 279.572 | 212.263 | 235.870 | 246.876 | 230.611 | 217.401 | 305.247 | 248.989 | 217.914 |
| | DISPERSION RATIO F0 | 1.013 | 1.283 | 1.027 | 1.082 | 1.133 | 1.058 | 1.002 | 1.401 | 1.143 | – |
| | t0 | 0.406 | 0.737 | 0.099 | 0.042 | 0.058 | 0.048 | 0.063 | 0.226 | 0.139 | – |
| POPULATION VARIANCE | ACCURACY | N.S | N.S | N.S | N.S | N.S | N.S | N.S | S | N.S | – |
| | SENSITIVITY | N.S | N.S | N.S | N.S | N.S | N.S | N.S | S | N.S | – |
| POPULATION MEAN VALUE | ACCURACY | N.S | N.S | N.S | N.S | N.S | N.S | N.S | S | N.S | – |
| | SENSITIVITY | N.S | N.S | N.S | N.S | N.S | N.S | N.S | N.S | N.S | – |

FIG. 7

| SHORT PATTERN SENSOR MODEL | A | B | C | D | E | F | G | H | I | J |
|---|---|---|---|---|---|---|---|---|---|---|
| AREA INCREASED IN ENTIRE SHORT PATTERN [mm²] | 0.28 | 0.51 | 0.81 | 1.12 | 4.65 | 4.65 | 9.29 | 18.58 | 2.34 | 0 |
| RATE OF INCREASE OF AREA OF A SENSOR [%] | 0.12 | 0.21 | 0.34 | 0.47 | 1.95 | 1.95 | 3.90 | 7.79 | 0.98 | 0.00 |
| DETERMINATION | NO | NO | NO | NO | YES | YES | YES | YES | NO | NO |
| Cm [fF] | 998.6 | 1005.6 | 1007.9 | 1012.7 | 1060.8 | 1051.4 | 1130.4 | 1330.0 | 1028.8 | 1000.8 |
| CM CHANGE RATE [%] | -0.23 | 0.48 | 0.71 | 1.19 | 5.99 | 5.05 | 12.95 | 32.89 | 2.79 | — |
| Cm' [fF] | 798.5 | 803.5 | 805.6 | 810.1 | 852.6 | 846.6 | 914.7 | 1098.9 | 823.9 | 798.5 |
| ΔCm | 200.1 | 202.1 | 202.4 | 202.6 | 208.2 | 204.8 | 215.7 | 231.1 | 204.9 | 202.3 |
| ACTUAL MEASUREMENT REFERENCE VALUE | 27392.8 | 27448.0 | 27579.2 | 27645.8 | 28530.8 | 28657.5 | 30460.3 | 32752.0 | 27886.2 | 27643.6 |
| PRESUMPTION REFERENCE VALUE | 26896.9 | 27015.8 | 27055.3 | 27136.3 | 27966.6 | 27801.5 | 29213.7 | 33106.2 | 27410.9 | 26935.2 |

| REFERENCE NUMERAL | NAME OF EACH LAYER | THICKNESS |
|---|---|---|
| a | Front Side Film | 0.1mm |
| b | OCA | 0.05mm |
| c | SENSOR GLASS | 1.1mm |
| d | SENSOR PATTERN PART | 35nm |
| e | OCA | 0.025mm |
| f | Back Side Film | 0.090mm |
| g | Air-Gap | 1.0mm |
| h | LCD (LIQUID CRYSTAL) | 1.0mm |

*FIG. 10B*

ELECTROSTATIC CAPACITANCE TOUCH PANEL

CROSS REFERENCE TO RELATED APPLICATION

The contents of the following Japanese patent application are incorporated herein by reference, Japanese Patent Application No. 2017-67214 filed on Mar. 30, 2017.

FIELD

The present invention relates to an electrostatic capacitance touch panel that can detect a touch position or an approach position of a finger or the like as the change of electrostatic capacity.

BACKGROUND

In recent years, many of display devices of various electronic devices, for example, display of mobile phone, include a liquid crystal display and a transparent electrostatic capacitance touch panel laminated over the surface of the liquid crystal display, and in such display devices, an instruction image displayed on the liquid crystal display is referred to, a location where the instruction image is displayed is touched by a finger or the like, and information corresponding to the instruction image can be input.

In an electrostatic capacitance touch panel in which transparent electrodes are formed over a transparent insulating substrate (for example, glass substrate), the outline of the electrodes is not prominent even if there is a difference of optical refractive index or reflection rate between the electrode and the insulated area if the width of the insulated area between the electrodes is 30 µm or less for example, according to the limit value of recognition of the shape by naked eyes.

However, in the manufacture of an electrostatic capacitance touch panel, after a transparent conductive film (for example, ITO film) is formed over one surface of an insulating substrate, an insulated area is formed by etching the transparent conductive film by a laser etching method or photolithography, and a first electrode to which a signal for detecting position is applied and a second electrode for outputting electrostatic capacity generated between the first electrode and the position to which a finger or the like approaches are formed. Note that, an optical layer for lowering the difference of the refractive index may be provided between the insulating substrate and the transparent conductive film.

At this time, if the transparent conductive film is etched so that the width between the electrodes is 30 µm or less over the whole length of the insulated area, it becomes highly possible that adjacent electrodes are short-circuited as an error of manufacture, and the ones with electrode short circuit are disposed as defective products. In addition, if the transparent conductive film is etched so that the width of the electrodes is 30 µm or less over the whole length of the insulated area, because the distance between the adjacent first electrode and second electrode becomes short, the line of electric force from the first electrode toward the second electrode via a space over the operation surface of the electrostatic capacitance touch panel is decreased. As a result, because the change of the line of electric force when a finger or the like touches or approaches becomes less, there will be a problem of decreased detection sensitivity.

Therefore, a technique is disclosed in which the width of the insulated area between the electrodes is made to be wider than 30 µm except the intersection of the electrodes, and a dummy electrode is provided to the portion with wide width of the insulated area between the electrodes in a floating state without short circuit to keep the detection sensitivity high and conceal the outline of the electrodes (Japanese Patent No. 4720857).

SUMMARY

However, in the electrostatic capacity type input device (electrostatic capacitance touch panel) disclosed in Patent Literature 1, because the area of the short-circuited dummy pattern is large when there is short circuit between the first translucency electrode pattern and the second translucency electrode pattern or the dummy pattern, position detection accuracy on the basis of detection of a electrostatic capacity value between the first and the second translucency electrode patterns is remarkably decreased due to large influence on the electrostatic capacity value detected proportional to the increase of the area, but Patent Literature 1 does not disclose this and does not disclose or suggest as to how a short-circuited product should be treated as a non-defective product or a defective product.

The present invention has been developed in order to solve the problems described above and the purpose of the present invention is to provide an electrostatic capacitance touch panel with high manufacturing yield that can significantly reduce occurrence of defective products due to occurrence of short circuit as compared with related art even if there is a short circuit between a dummy pattern and an electrode included in an insulated area with the wide width recognized as distinct from the electrode.

In order to accomplish the purpose described above, an electrostatic capacitance touch panel according to an aspect of the present invention includes, over the same surface of an insulating substrate: several first electrodes; several second electrodes; and a dummy pattern made of the same material as the electrode provided in an insulated area between the adjacent first electrode and second electrode or a material including one refractive index, and the dummy pattern is segmented in the long direction of the insulated area.

In the related art of Patent Literature 1, because one dummy pattern is provided in an insulated area with the wide width recognized as distinct from the electrode, when the dummy pattern and the electrode are short-circuited, the area of the dummy pattern increased by the short circuit becomes significantly large with respect to the area of the electrode even if the short circuit occurs at only one location, and the change of the electrostatic capacity to the electrostatic capacity value without short circuit becomes large and the location of the operation part cannot be accurately detected; therefore, because a product with only one short circuit should be treated as a defective product, the rate of occurrence of defective products is high, and manufacturing yield is low. In contrast, the structure according to an aspect of the present invention includes several segmented dummy patterns at the insulated area with the wide width recognized as distinct from the electrode. Therefore, because the increase of the area of the dummy pattern short-circuited with the electrode to the area of the electrode is prevented to low level if the number of the locations of short circuit is small even if the segmented dummy patterns are short-circuited with the electrode. Accordingly, it is possible to accurately detect the position of the operation part even if short circuit occurs and it is possible to significantly decrease the number of defective products due to short circuit as compared with the related art. An aspect of the present invention includes both a case in which the segmented several dummy patterns are formed to be equal areas and a case in which they are formed in random sizes.

In the electrostatic capacitance touch panel according to an aspect of the present invention, it is preferable that each of the first electrodes and each of the second electrodes have a sensor pattern part in a chain shape, the sensor pattern part of each of the first electrodes has a predetermined area necessary for detecting a position of the operation part, the sensor pattern part of the first electrode is provided in a shape of linear connection, the sensor pattern part of each of the second electrodes has a predetermined area necessary for detecting a position of the operation part, the sensor pattern part of the second electrode is provided in a shape of linear connection, the dummy pattern is short-circuited with only one of the sensor pattern part of the first electrode and the sensor pattern part of the second electrode, and when the number of dummy patterns short-circuited with the sensor pattern part is n (n is natural number not including 0), the size of one dummy pattern is determined so that the sum of the area of n dummy patterns is 0.47% or less of the area of the sensor pattern part of the first and the second electrodes.

In addition, in the electrostatic capacitance touch panel according to an aspect of the present invention, the dummy pattern is preferably segmented into substantially equal areas.

According to an aspect of the present invention, if the number of short circuit is n or less, the area is increased by 0.47% or less relative to the area of the sensor pattern part of the first and the second electrodes, and on the basis of the result of the simulation and within this range, it can be determined that it is a non-defective product that can accurately detect the position of the operation part even if there is short circuit. Therefore, manufacturing yield can be improved. Note that, the number n and the area of the dummy pattern can be arbitrarily determined according to the possibility of occurrence of short circuit in manufacture.

In the electrostatic capacitance touch panel according to an aspect of the present invention, each of the first electrodes has a predetermined area necessary for each of the sensor pattern parts to detect a position on of the operation part, the sensor pattern part of the first electrode is provided in a shape of linear connection, each of the second electrodes has a predetermined area necessary for each of the sensor pattern parts to detect a position of the operation part, the sensor pattern part of the second electrode is provided in a shape of linear connection, the dummy pattern is short-circuited with only one of the sensor pattern part of the first electrode and the sensor pattern part of the second electrode, and within the predetermined range, with respect to an electrostatic capacity value between the sensor pattern part of the first electrode and the sensor pattern part of the second electrode, an electrostatic capacity value when the sensor pattern part is short-circuited with the dummy pattern is increased by 1.19% or less as compared with an electrostatic capacity value when the sensor pattern part is not short-circuited with the dummy pattern.

An aspect of the present invention includes both a case in which the segmented several dummy patterns are formed to be equal areas and a case in which they are formed in the random sizes, and on the basis of the result of the experiment, with segmentation of the dummy pattern, if short circuit occurs less and the rate of increase of the electrostatic capacity value is less than the predetermined rate even if there is short circuit between the sensor pattern part and the dummy pattern, it can be determined that it is a non-defective product that can accurately detect the position of the operation part even if there is short circuit. Therefore, manufacturing yield can be improved.

According to an aspect of the present invention, it is possible to provide an electrostatic capacitance touch panel with high manufacturing yield that can significantly reduce occurrence of defective products due to occurrence of short circuit as compared with related art even if there is short circuit between the dummy pattern and the electrode included in the insulated area with the wide width recognized as distinct from the electrode.

DESCRIPTION OF EMBODIMENTS

Hereinafter, an electrostatic capacitance touch panel according to the present embodiment will be described with reference to the drawings.

An electrostatic capacitance touch panel according to the present embodiment includes an insulating substrate such as transparent glass and transparent plastic, several lines of first electrodes formed over the upper surface of the insulating substrate, several lines of second electrodes, and an insulating film laminated over the upper surface of the insulating substrate, and can precisely determine the position by recognizing the change of electrostatic capacity of a nearby electrode when an operation part such as finger touches or approaches by two vertical and horizontal electrode lines and can detect multi points. Hereinafter, the several lines of first electrodes formed over the upper surface of the insulating substrate and the several lines of second electrodes will be described. Note that, existence of the laminated insulating film is arbitral.

Figure 1:
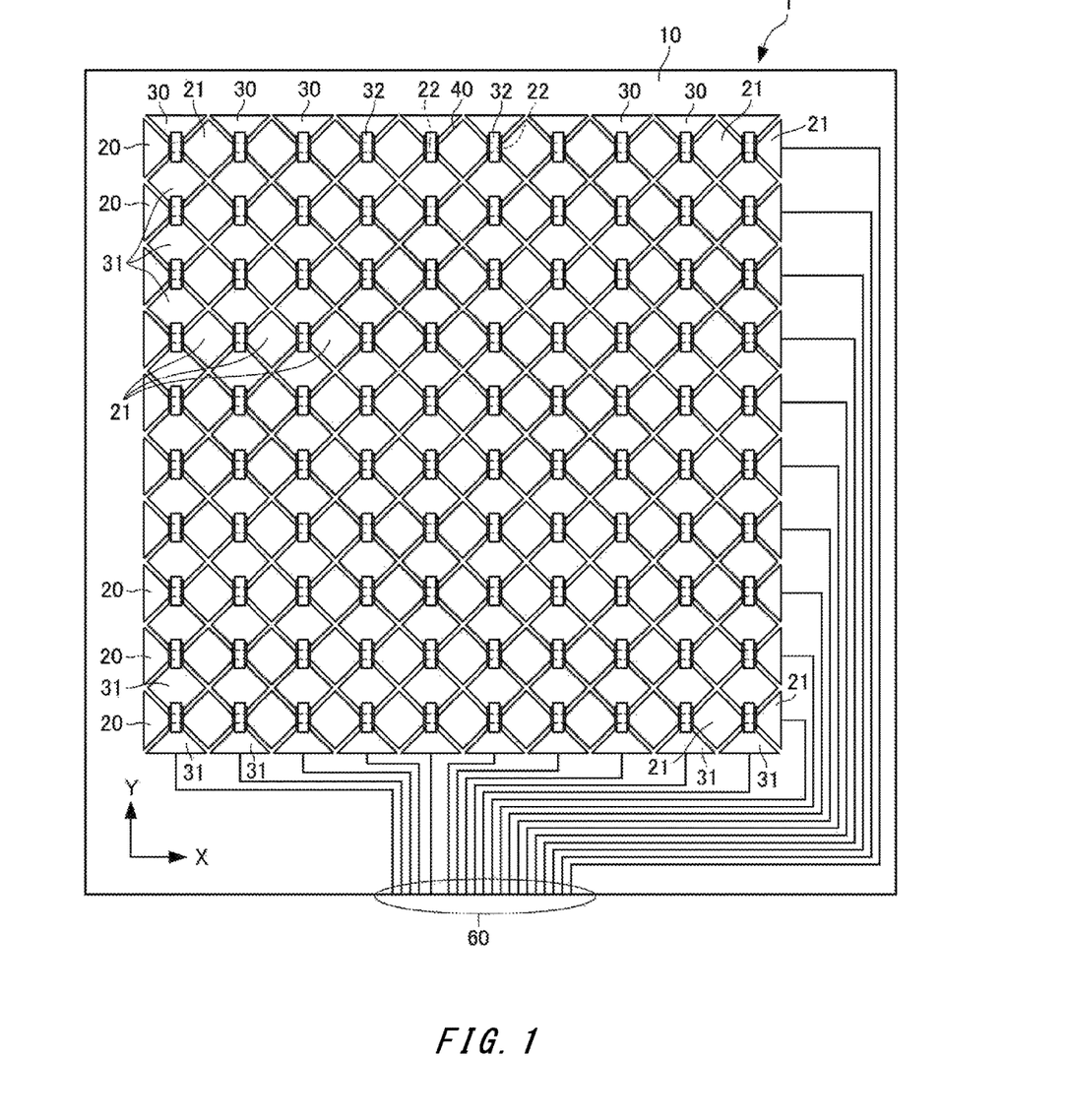
FIG. 1 is a front view illustrating a model electrostatic capacitance touch panel according to an embodiment of the present invention.

As illustrated in FIG. 1, an electrostatic capacitance touch panel 1 according to the present embodiment includes several lines of first electrodes 20 in the arrow Y direction with several rhombic sensor pattern parts 21 extending in the first direction indicated by the arrow X in a line form, and several second electrodes 30 in the arrow X direction with several rhombic sensor pattern parts 31 in the second direction indicated by the arrow Y in a line form are provided over the same surface (input surface) of an insulating substrate 10. Terminals indicated by the reference numeral 60 as terminals of lead lines of the several lines of first electrodes 20 and the several lines of second electrodes 30 are connected to a control IC (not illustrated).

For example, a signal for detecting a position is sequentially applied to the several lines of first electrodes 20, and at that time, if an operation part such as finger as a conductor contacts or approaches any location, there will be electrostatic capacity between the first electrode 20 and the second electrode 30 and the operation part, and as a result of this, electrostatic capacity is changed. Therefore, on the basis of the change of the signal detected by the several second electrodes 30 in accordance with the signal for detecting a position, whether or not the operation part touches any location and approach of the operation part or the touch position (position in the X direction and position in the Y direction) are detected.

In the electrostatic capacitance touch panel 1, for example, after a transparent conductive film is formed over one surface of the insulating substrate 10, the transparent conductive film is etched by a laser etching method or photolithography to remove the transparent conductive film located between the first electrode 20 and the second electrode 30, thereby the first electrode 20 and the second electrode 30 are formed. The part where the transparent conductive film is removed is exposed as an insulated area 40.

While each of the first electrodes 20 includes a thin connecting part 22 connecting two sensor pattern parts 21 in a chain form that extends integrally with the sensor pattern parts 21, each of the second electrodes 30 is formed by, after an insulating cover film is laminated over the connecting part 22 of the first electrode 20, forming a thin connecting part 32 connecting two sensor pattern parts 31 in a chain form so as to connect with adjacent two sensor pattern parts 31 over the connecting part 22.

Transparent glass is used for the insulating substrate 10, for example, and the first electrode 20 and the second electrode 30 are made of a transparent conductive film such as ITO (indium tin oxide thin film) and IZO (indium zinc oxide thin film). Each of the sensor pattern parts 21 and 31 has a predetermined area necessary for detecting approach or touch position of an operation part such as finger, and specifically, is formed in a rhombic shape with the diagonal line of about 5 mm, for example.

Figure 2:
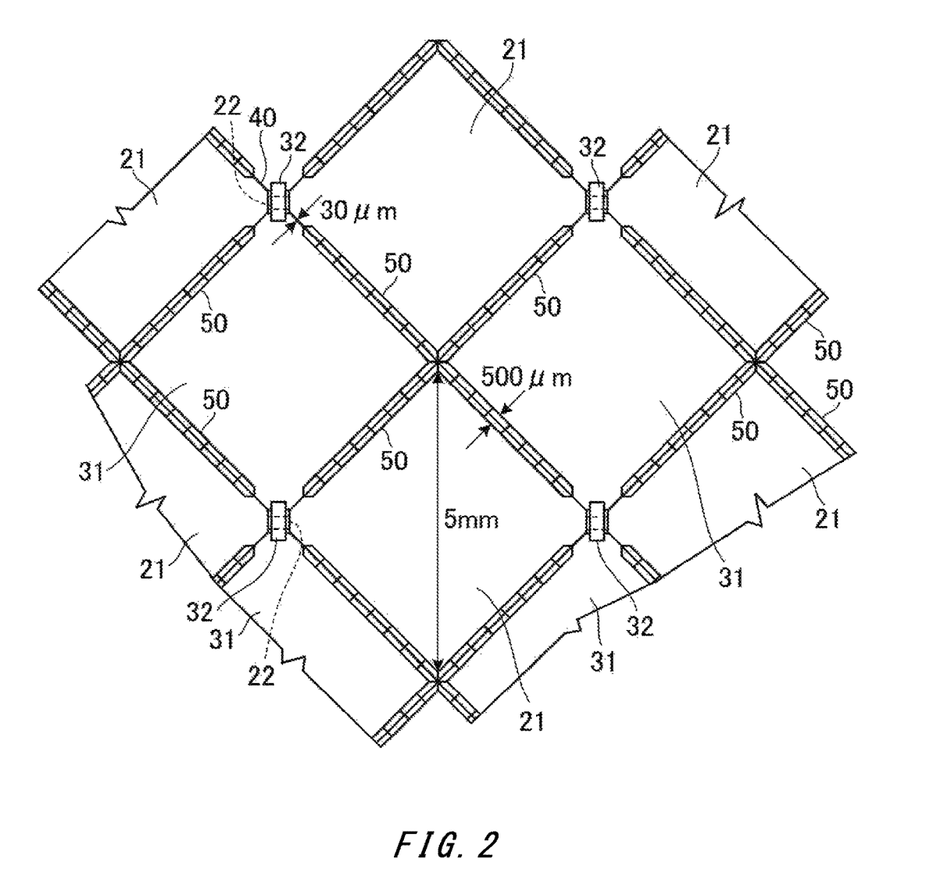
FIG. 2 is a model partial enlargement view illustrating the model electrostatic capacitance touch panel according to an embodiment of the present invention.
Figure 3:
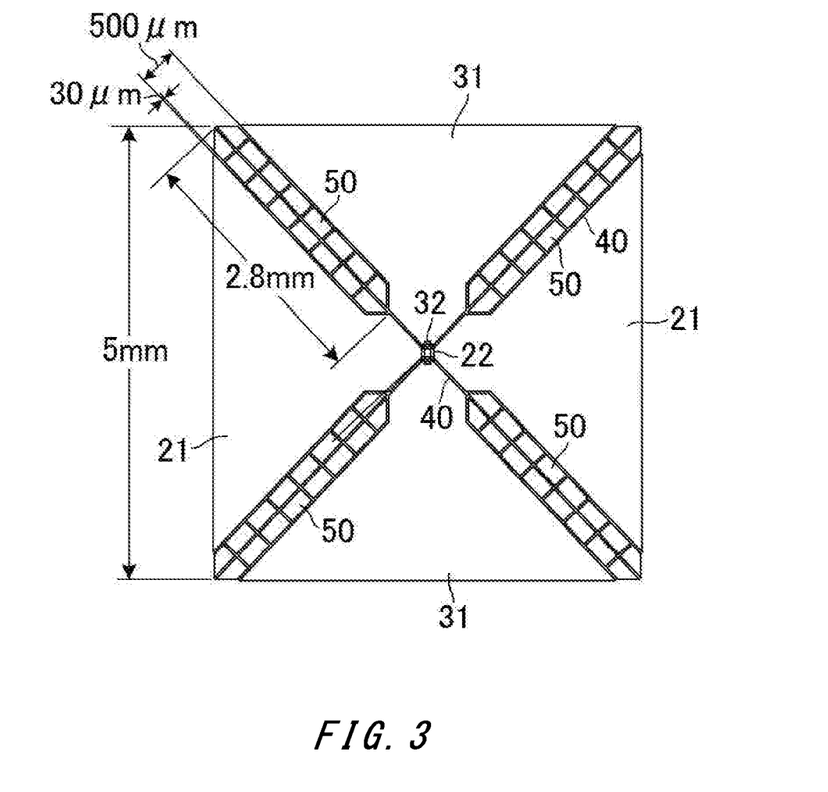
FIG. 3 is an enlargement view illustrating one sensor pattern part of the model electrostatic capacitance touch panel according to an embodiment of the present invention.

As illustrated in FIGS. 2 and 3, an insulated area 40 surrounds four sides of rhombus of each of the sensor pattern parts 21 and 31, is formed in thin width of 30 µm or less near the raised intersection of the connecting part 22 of the first electrode 20 and the connecting part 32 of the second electrode 30, and is formed in thin width of 30 µm or less so as to surround one or several lines of dummy patterns 50 segmented along the four sides of rhombus of each of the sensor pattern parts 21 and 31 in other parts.

The dummy pattern 50 is formed by performing a laser etching method or the like on a transparent conductive film formed over one surface of the insulating substrate 10 when the first electrode 20 and the second electrode 30 are formed. Note that, the dummy pattern 50 may be formed in a shape segmented from a material with the same refractive index as the first and the second electrodes 20 and 30 after the area other than raised intersection of the connecting part 22 and the connecting part 32 of the insulated area 40 is formed in wide width. That is, the dummy pattern 50 is made from the same material as or a material with the same refractive index as the first and the second electrodes 20 and 30. The part of the insulated area 40 surrounding the segmented dummy patterns 50 is formed in a grid pattern, a ladder pattern, or a hexagonal pattern.

In this embodiment, the dummy pattern 50 is segmented along the four sides of the rhombus sensor pattern parts 21 and 31 and formed in two lines. Note that, the dummy pattern 50 may be formed in one line or in three or more lines. The insulated area 40 surrounding the segmented dummy patterns 50 separates the adjacent sensor pattern parts 21 and 31 by the width of 500 µm, for example. The width of the insulated area 40 segmenting the dummy pattern 50 is 30 µm or less.

Areas of each part in this embodiment will be described in detail. In the areas of the segmented dummy patterns 50, the smaller one of two trapezoid dummy patterns positioned near the raised intersection is 0.057 mm², and the larger one is 0.070 mm², and other rectangle dummy patterns are 0.077 mm². That is, the dummy pattern 50 is segmented into substantially equal areas. In addition, with respect to the areas of the sensor pattern parts 21 and 31, the sensor pattern part 21 is 13.2 mm², and the sensor pattern part 31 is 13.3 mm². In an electrostatic capacitance touch panel, because detection is performed on the basis of the electrostatic capacity generated between one pair of the sensor pattern part 21 and the sensor pattern part 31, 26.5 mm², which is the sum of these areas, is used as a reference value of the area of the sensor pattern part.

As a necessary condition for a non-defective product, segmented dummy patterns 50 should not be short-circuited with both of the sensor pattern parts 21 and 31 or should not short-circuited with one of the sensor pattern parts 21 and 31 even if it is short-circuited with the other. If it is short-circuited with at least one of the adjacent sensor pattern parts 21 and 31 through the segmented dummy patterns 50, since it is not possible to accurately detect the touch position at the short circuit location, such an electrostatic capacitance touch panel 1 is a defective product.

In particular, the electrostatic capacitance touch panel 1 according to the present embodiment is an ideal non-defective product without any short circuit between each of the sensor pattern parts 21 and 31 and the segmented dummy patterns 50, and the present embodiment of course includes such a state, and a product with less than the predetermined number of short circuit with the segmented dummy patterns 50 that satisfy one of the condition A and the condition B is also a non-defective product, and the present embodiment includes such a state.

The condition A requires predetermined relationship between the area of the segmented dummy patterns 50 and the number of short-circuited dummy patterns 50. Specifically, if it is short-circuited, when the maximum number of short-circuited dummy patterns 50 is n for each of the sensor pattern parts 21 and 31 (n is a natural number not including 0), the size of one dummy pattern 50 should be determined so that the sum of the areas of n dummy patterns 50 is 0.47% or less of the area of the sensor pattern parts 21 and 31 of the first and the second electrodes 20 and 30. A preferable condition that can be added to the condition A is that the dummy pattern 50 is segmented into substantially equal areas.

If the condition A is satisfied, because the sum of the areas of n dummy patterns 50 is 0.47% or less of the area of the sensor pattern parts 21 and 31 of the first and the second electrodes 20 and 30, the area is increased by 0.47% or less of the areas of the sensor pattern parts of the first and the second electrodes if the number of short circuit is n or less. Based on the result of simulation, because it can be determined to be a non-defective product that can accurately detect the position of the operation part even if short circuit occurs within this range, manufacturing yield can be improved. Note that, the number n and the areas of the segmented dummy patterns 50 may be any number according to possibility of occurrence of short circuit in manufacture.

The condition B relates to the limitation of the size of change in electrostatic capacity. In particular, with respect to the electrostatic capacity value between the sensor pattern part 21 of the first electrode 20 and the sensor pattern part 31 of the second electrode 30 corresponding to one detecting position of the operation part, the electrostatic capacity value when one of the two sensor pattern parts 21 and 31 is short-circuited with the segmented dummy patterns 50 is increased by 1.19% or less as compared with the electrostatic capacity value when neither of the two sensor pattern parts 21 and 31 is short-circuited with the dummy pattern 50.

If the condition B is satisfied, a case in which the segmented several dummy patterns are formed to be equal areas and a case in which they are formed in random sizes are included in the present embodiment, and even if there is short circuit between the sensor pattern part and the dummy pattern due to segmentation of the dummy pattern, because it can be determined to be a non-defective product that can accurately detect the position of the operation part even if there is short circuit if the number of short circuit is few and the rate of increase in the electrostatic capacity value is less than the predetermined rate. Therefore, manufacturing yield can be improved.

The basis of requirement of the condition A and the basis of requirement of the condition B are derived from the results of the evaluation of influence on electric characteristics in a real product and evaluation of influence on electric characteristics in simulation, which will be described below.

[Evaluation of Influence on Electric Characteristics by Real Product]

Figure 4:
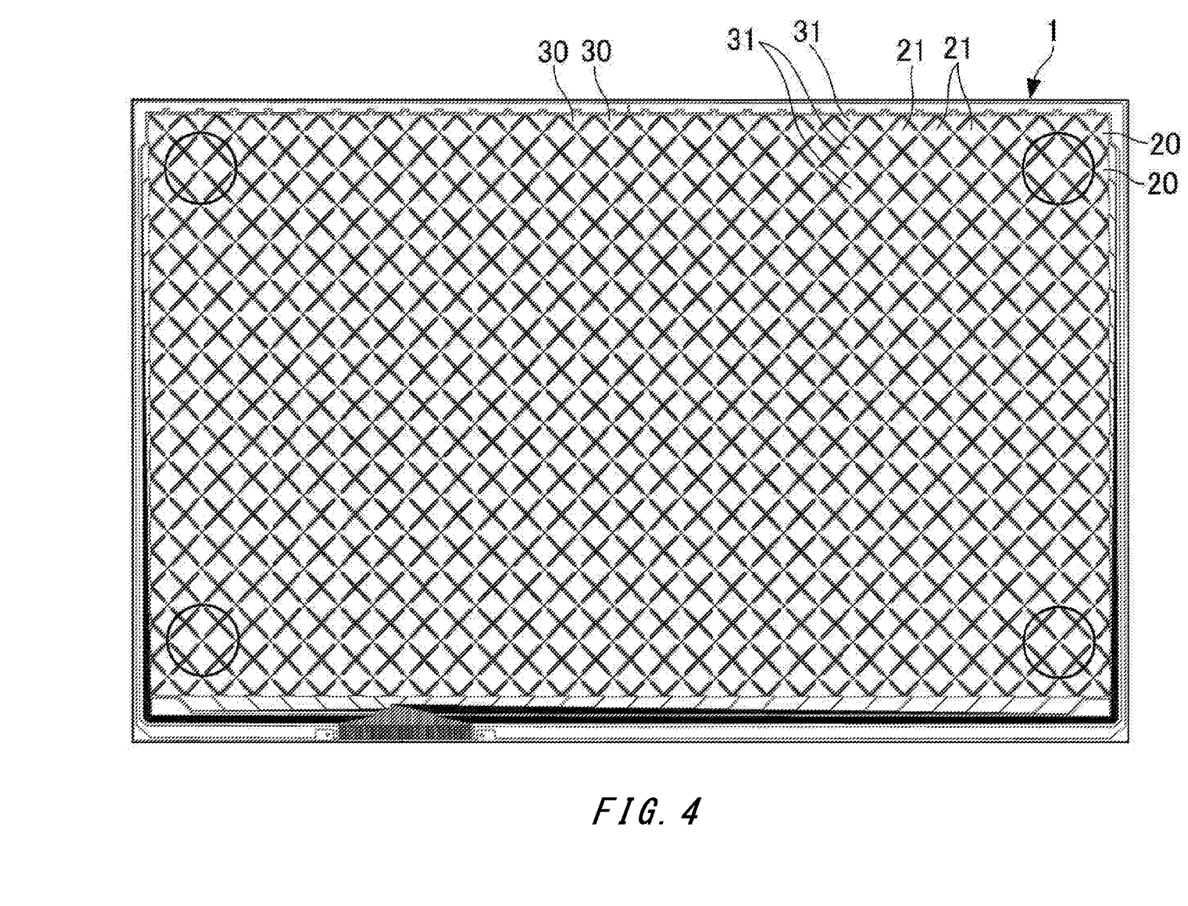
FIG. 4 is a front view illustrating a real electrostatic capacitance touch panel according to an embodiment of the present invention.

First, ten types of the electrostatic capacitance touch panel 1 illustrated in FIG. 4 were prepared. As illustrated in FIGS. 2 and 3, each of the ten types of the electrostatic capacitance touch panel 1 includes the first electrode 20 and the second electrode 30 so as to include segmented dummy patterns.

With respect to the dummy patterns at four corners circled in FIG. 4 of the ten types of the electrostatic capacitance touch panel 1, the four dummy patterns of one touch panel are short-circuited at the same time, and the number of short circuit is different between different touch panels. In FIG. 4, the coordinates of the short circuit positions at the four corners of the dummy patterns are (T×1, R×1) at the upper left short circuit position, (T×1, R×14) at the lower left short circuit position, (T×26, R×1) at the upper right short circuit position, and (T×26, R×14) at the lower right short circuit position. The list of FIG. 5 shows relationship between the state of short circuit of the ten types of dummy patterns A, B, C, D, E, F, G, H, I, and J and the number of short circuit.

Figure 6:
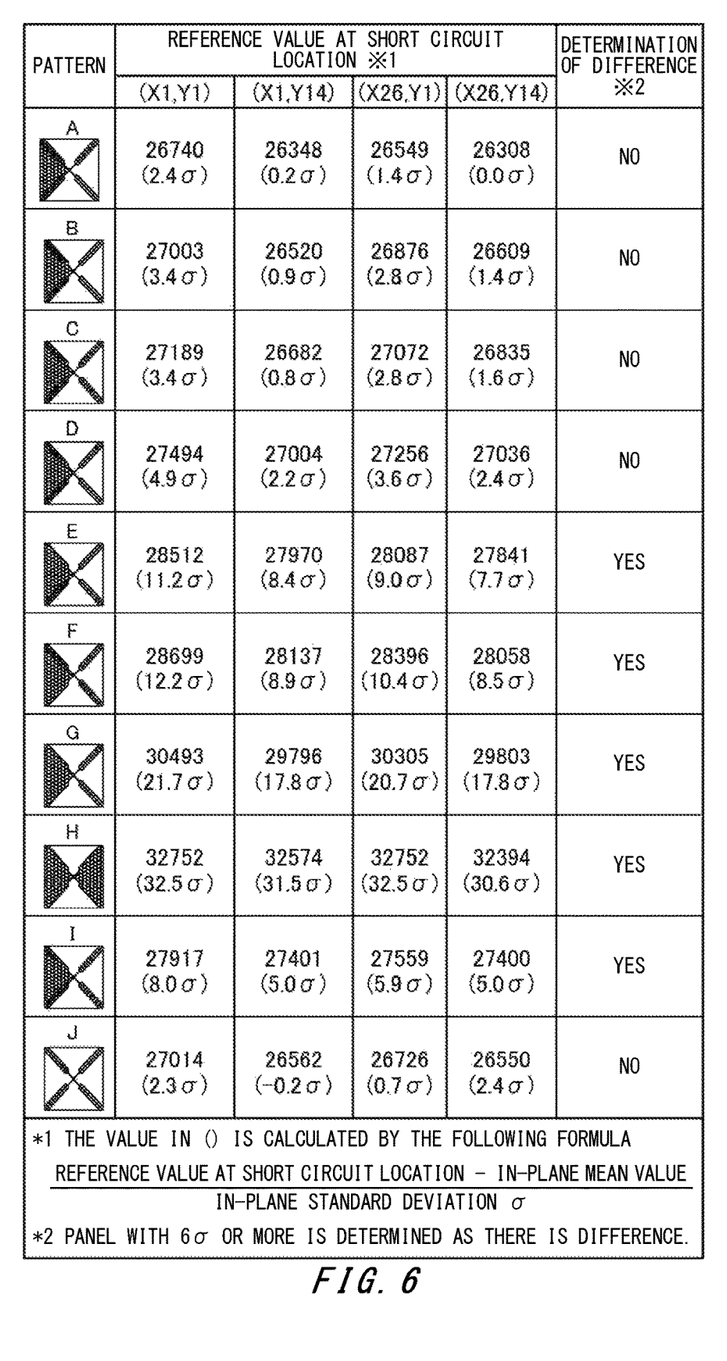
FIG. 6 is a list of the positional coordinates and the shapes of short circuit at four corners of the real electrostatic capacitance touch panel according to an embodiment of the present invention.

The list of FIG. 6 shows the result of confirmation of influence of Reference value as one index number of evaluation of degree of influence on electric properties by a real product with respect to the ten types of electrostatic capacitance touch panel 1 with different short circuit of dummy pattern. Note that, Reference value refers to an index value for examination used as an index representing the electrostatic capacity value in electrical examination on electrostatic capacitance touch panel and is a value with correlation with an electrostatic capacity value in accordance with conditions such as area of electrode and width of insulated area.

Figure 5:
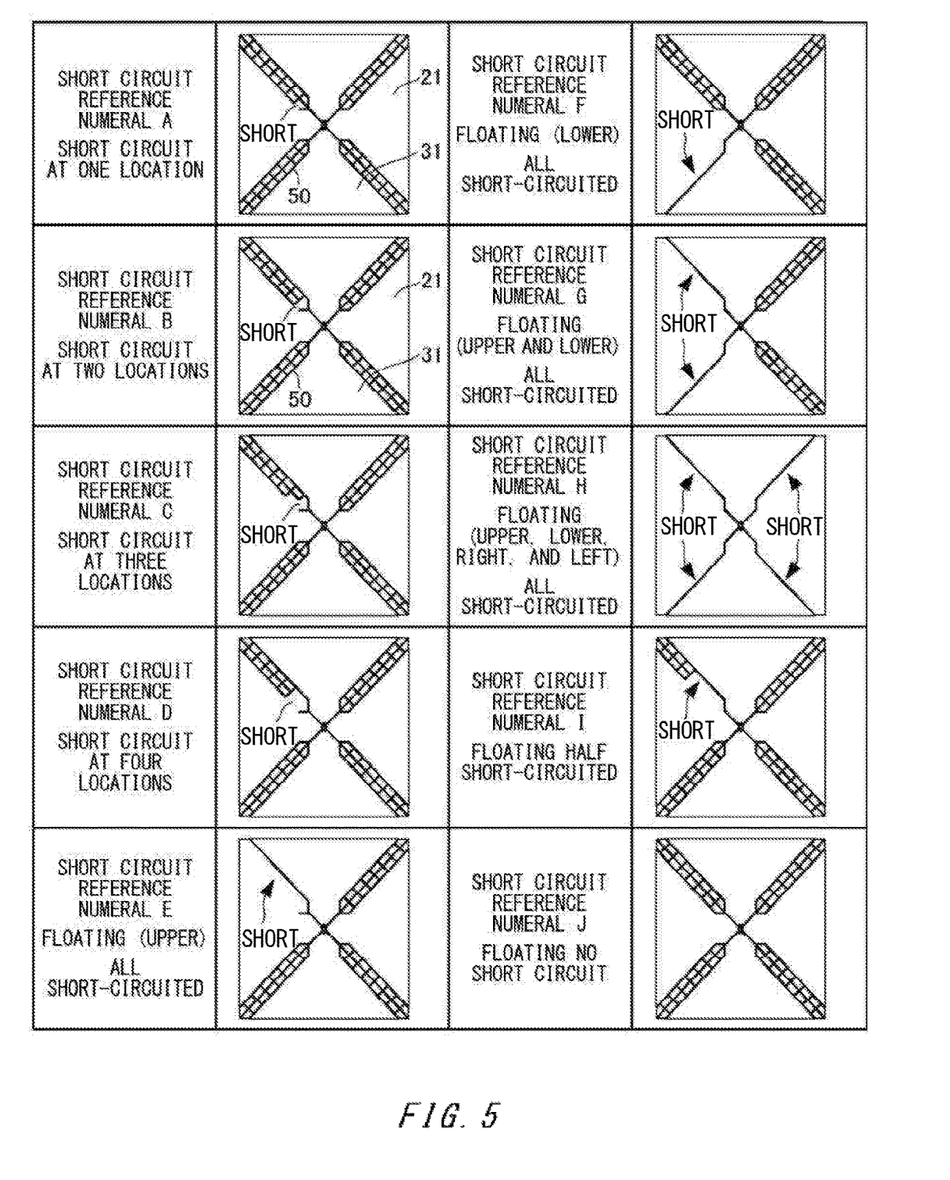
FIG. 5 is a list showing the shapes of ten types of short circuit applied to the real electrostatic capacitance touch panel according to an embodiment of the present invention.
Figure 7:
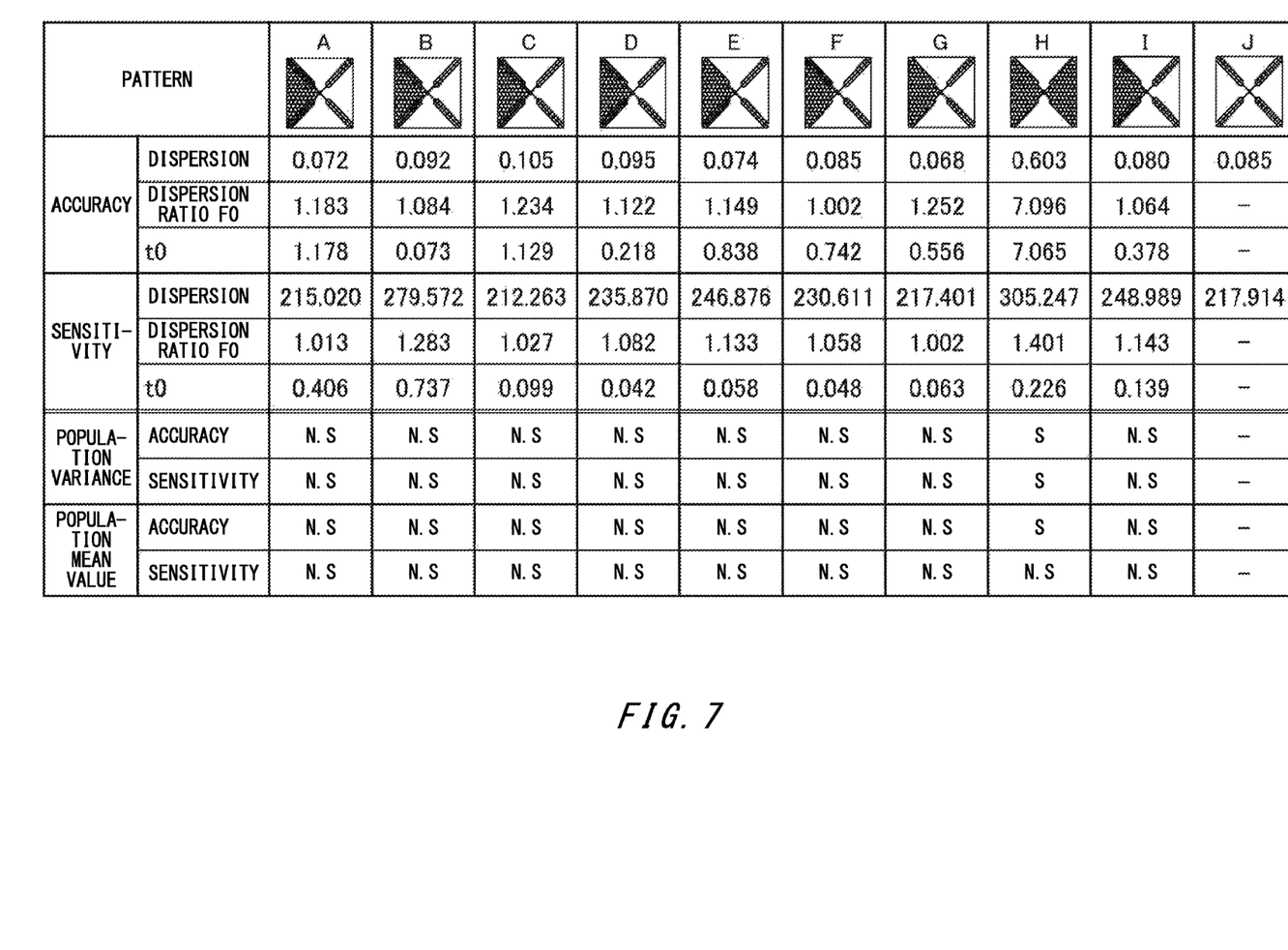
FIG. 7 is a list showing results of confirmation regarding influence on sensitivity and accuracy, which are obtained by checking if there is a difference on mean value and dispersion between samples with short circuit and samples without short circuit, regarding ten types of real electrostatic capacitance touch panels with different short circuit of the dummy pattern according to an embodiment of the present invention.

The list of FIG. 7 shows the result of confirmation of influence on sensitivity and accuracy after examination to find difference in mean value and dispersion (F examination, t examination) with respect to nine types of short-circuited sample indicated as A to I and sample with dummy pattern J that is not short-circuited in the list of FIG. 5 as one index number of evaluation of the degree of influence on electric properties by a real product with respect to the ten types of the electrostatic capacitance touch panel 1 with different short circuit of dummy pattern. As a calculation condition, significance level 0.1% one side inspection→F value: 1.393, t value: 3.495, degree of freedom: 395 (point around short pattern 396–1) are set. In FIG. 7, 'S' indicates significant difference and 'N. S.' indicates no significant difference.

As the result of the list of FIG. 6 and the result of the list of FIG. 7 are examined, the following two findings are found. (1) Reference value became a value over in-plane dispersion 6 σ when the half of the segmented dummy patterns of one side of the sensor pattern part are short-circuited, that is, in case of short circuit reference numeral E. Therefore, at least, it can be treated as a non-defective product when there is short circuit in the area less than that. (2) With respect to sensitivity and accuracy, there is a significant difference from the case in which lower-upper and right-left dummy patterns are short-circuited. Therefore, it can be said that the degree of influence when the dummy pattern is short-circuited is low.

[Evaluation of Influence on Electric Characteristics by Simulation]

A method for examining electric characteristics in simulation will be described.

Figure 8:
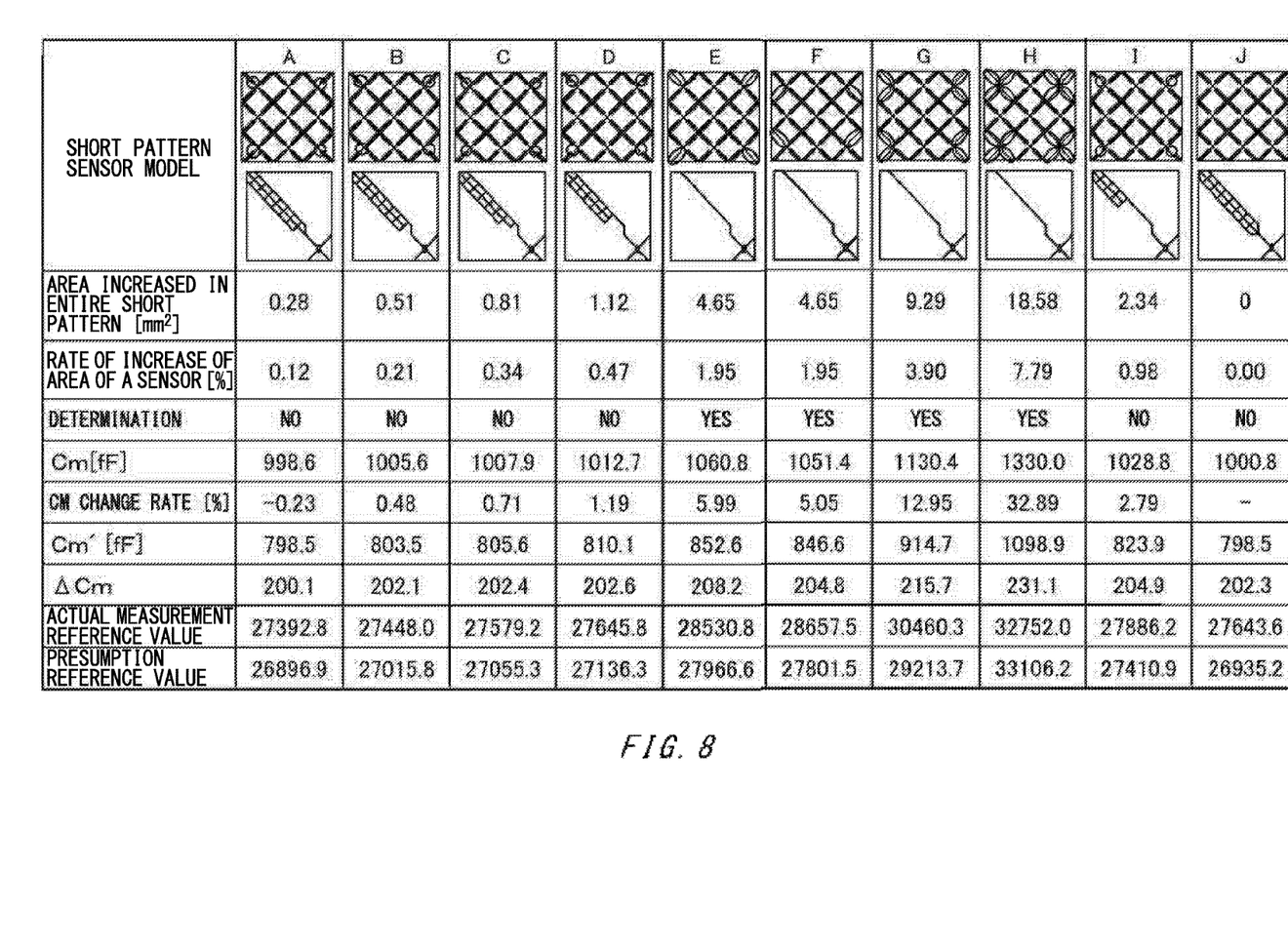
FIG. 8 is a list showing results of simulation measurement showing results of measurement of electrostatic capacity when touch-off and electrostatic capacity when touch-on and the like regarding a short pattern sensor as the electrostatic capacitance touch panel according to an embodiment of the present invention.
Figure 9:
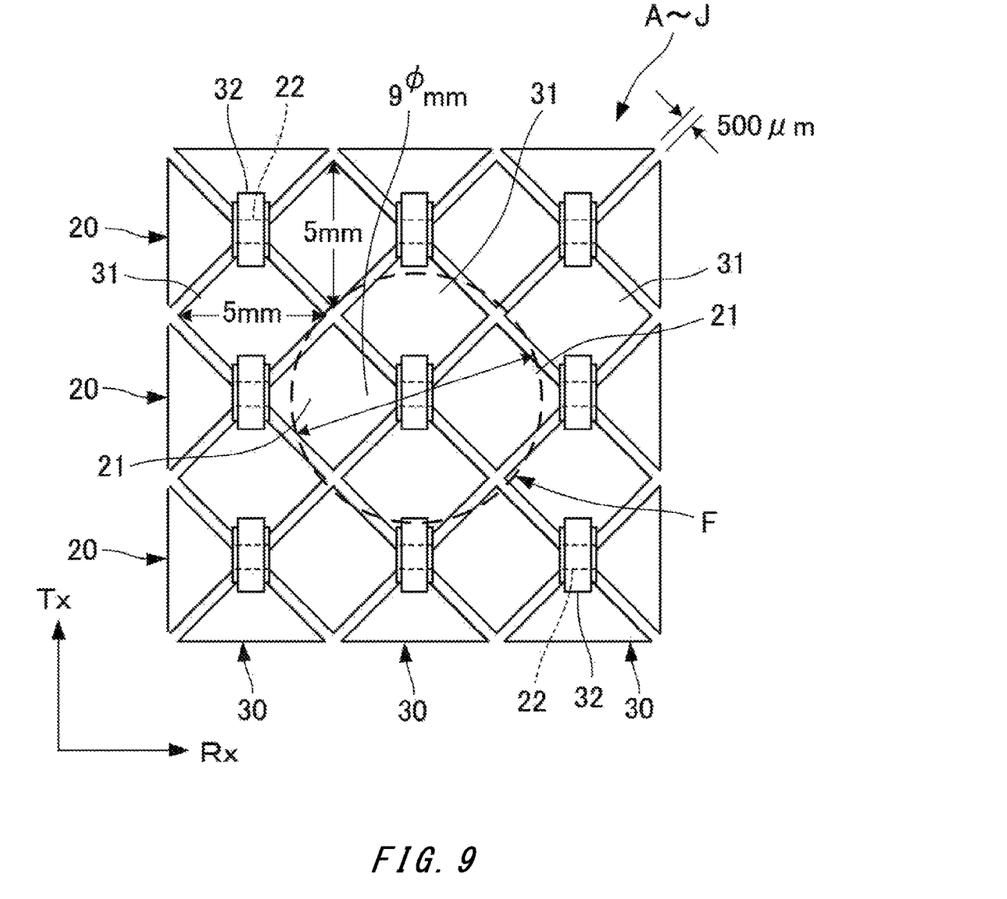
FIG. 9 illustrates a structure of the short pattern sensor as the electrostatic capacitance touch panel according to an embodiment of the present invention.

First, ten types of short pattern sensor models A to J shown in FIG. 8 were prepared. Note that, these short pattern models correspond to the ten types of short pattern A to J used for evaluation of influence on electric characteristics by a real product shown in FIGS. 5 and 6. As illustrated in FIG. 9, each of the short pattern sensor models A to J includes three lines of the first electrode 20, the second electrode 30 and one sensor pattern part with segmented dummy patterns in the X and Y directions. In FIG. 9, the dummy pattern is not illustrated. In the first electrode 20, the sensor pattern parts 21 are connected by the thin connecting part 22 and in the second electrode 30, the sensor pattern parts 31 are connected by the thin connecting part 32. This structure is as described with reference to FIGS. 2 and 3.

With respect to the dummy patterns at four corners surrounded by circle or ellipse in FIG. 8 out of the segmented dummy patterns, the short pattern sensor models A to J are short-circuited in ten types shown in the list of FIG. 5. That is, there are four short circuit at the same time in one short pattern sensor model and there are ten types of short circuit as shown in the list of FIG. 5 so that the number of short circuit is different between different touch panels.

Figure 10A:
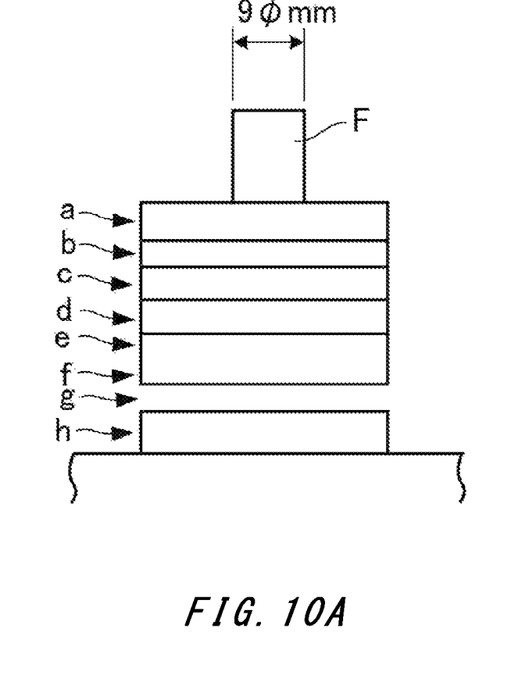
FIG. 10A shows a method of simulation measurement on the short pattern sensor as the electrostatic capacitance touch panel according to an embodiment of the present invention.
Figure 10B:
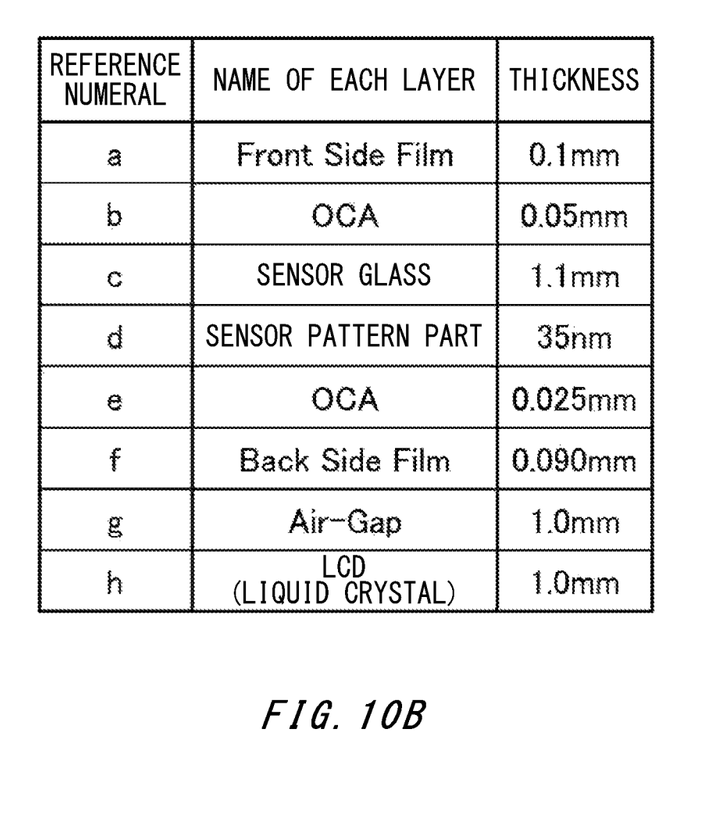
FIG. 10B shows a method of simulation measurement on the short pattern sensor as the electrostatic capacitance touch panel according to an embodiment of the present invention.

The simulation measurement on the short pattern sensor models A to J is performed by laminating several members a to h and regarding as touch-on when the operation part F as a brass model finger is placed at the center of the short pattern sensor model and as touch-off when it is not placed, as shown in FIGS. 10A and 10B. The ten types of short pattern sensor models A to J shown in FIG. 8 are exchanged as the sensor pattern part of the member d.

The list of FIG. 8 shows the measurement result of electrostatic capacity when touch-off and electrostatic capacity when touch-on and the like generated between the central first electrode 20 in the vertical three lines and the second electrode 30 in the horizontal three lines as simulation measurement regarding the short pattern sensor models A to J.

The list of FIG. 8 shows capacitance Cm [fF] when touch-off, capacitance Cm' [fF] when touch-on, Cm change rate calculated from Cm and Cm' (=(capacitance Cm [fF] of each short pattern sensor model A to I÷capacitance Cm [fF] of short pattern sensor model J)×100) [%], actual measurement Reference value, presumption Reference value, ΔCm: sensitivity (=(electrostatic capacity when touch-off-electrostatic capacity when touch-on) [fF], actual measurement Reference value, presumption Reference value, area of entire short pattern sensor model [mm$^2$], and rate of increase of area per one sensor. In the determination items in the list of FIG. 8, "No" indicates one that is assumed not to pass electrical inspection from the presumption Reference value and "Yes" indicates one that is assumed to pass electrical inspection from the presumption Reference value.

Considering the result of simulation measurement, following findings are found.

(1) There is a correlation by 98% or more between electrostatic capacity Cm and Reference value.
(2) Determination value of standard of non-defective product of Reference value is in the range of 24000<Reference value<27600, and it is assumed that the short pattern sensor models E, F, G, and H does not pass electrical inspection from presumption Reference value, that is, are defective products by determination by electrical inspection (determination: Yes).
(3) Since the control range of electrostatic capacity of control IC is 0.6 to 3.0 [pF], electrostatic capacity can be controlled by control IC.
(4) From Reference value, it seems that the short pattern sensor models E to H have a problem in operation of touch panel.
(5) For example, while sensitivity of the short pattern sensor model H is increased by 14% as compared with the short pattern sensor model J (with respect to ΔCm, model J: 202.3, model H: 231.1), it seems that, from presumption Reference value, there is a problem in operation of touch panel. This is also the same with the short pattern sensor models E to G.
(6) Cm change rate of the short pattern sensor model I is 2.79, and it is possible to reduce the degree of influence on Reference value. However, since in-plane dispersion is confirmed to be sometimes over 6 σ from the measurement result of electric characteristics by a real product, it is preferable that Cm change rate be 1.19 or less which corresponds to that of the short pattern sensor model D and rate of increase of area by short circuit per one sensor be 0.47 or less. In consideration of these, the values of the conditions A and B described above are defined.

As described above, according to the embodiment, since the insulated area with wide width recognized as distinct from the first and the second electrodes 20 and 30 out of the insulated area 40 which is the border between the first and the second electrodes 20 and 30 has several segmented dummy patterns 50, it is possible to prevent increase of area of the dummy pattern 50 short-circuited with the electrode to the area of the electrode, accurately detect the position of the operation part, and significantly decrease the number of defective products due to short circuit as compared with related art if the number of short-circuit is small even if there is short circuit between a few number of dummy patterns 50 and electrodes in the manufacturing process. On the other hand, in the related art of Patent Literature 1, the area of the dummy pattern increased by short circuit to the area of the electrode becomes significantly large even if there is only one short circuit if the dummy pattern is short-circuited with the electrode, change of electrostatic capacity to electrostatic capacity value in the case of no short circuit is large, and it is not possible to accurately detect the position of the operation part; therefore, a product with only one short circuit should be treated as defective product and rate of occurrence of defective products is high and manufacturing yield is low.

As described above, according to an aspect of the present invention, the insulated area with wide width recognized as distinct from the electrode in the manufacturing process has the dummy pattern and it is possible to clearly separate non-defective product and defective product in product inspection even if there is short circuit between the dummy pattern and the electrode. Therefore, product yield is high and it is useful for electrostatic capacitance touch panel in general.

REFERENCE SIGNS LIST 1 electrostatic capacitance touch panel
10 insulating substrate
20 first electrode
21 sensor pattern part
30 second electrode
31 sensor pattern part
40 insulated area
50 dummy pattern
F operation part

The invention claimed is:
1. An electrostatic capacitance touch panel comprising, over the same surface of an insulating substrate:
several first electrodes;
several second electrodes; and
a dummy pattern made of the same material as or a material with the same refractive index as the electrode provided in an insulated area between the adjacent first electrode and second electrode, wherein
the dummy pattern is segmented in the long direction of the insulated area,
each of the first electrodes and each of the second electrodes has a sensor pattern part in a chain shape, the sensor pattern part of each of the first electrodes has a predetermined area necessary for detecting a position of the operation part, the sensor pattern part of the first electrode is provided in a shape of linear connection, the sensor pattern part of each of the second electrodes has a predetermined area necessary for detecting a position of the operation part, the sensor pattern part of the second electrode is provided in a shape of linear connection, the dummy pattern is short-circuited with only one of the sensor pattern part of the first electrode and the sensor pattern part of the second electrode, and when the number of dummy patterns short-circuited with the sensor pattern part is n (n is natural number not including 0), the size of one dummy pattern is determined so that the sum of the area of n dummy patterns is 0.47% or less of the area of the sensor pattern part of the first and the second electrodes.

2. The electrostatic capacitance touch panel according to claim 1, wherein the dummy pattern is segmented into substantially equal areas.

3. An electrostatic capacitance touch panel comprising, over the same surface of an insulating substrate:

several first electrodes;

several second electrodes; and a dummy pattern made of the same material as or a material with the same refractive index as the electrode provided in an insulated area between the adjacent first electrode and second electrode, wherein the dummy pattern is segmented in the long direction of the insulated area, each of the first electrodes and each of the second electrodes has a sensor pattern part in a chain shape, the sensor pattern part of each of the first electrodes has a predetermined area necessary for detecting a position of the operation part, the sensor pattern part of the first electrode is provided in a shape of linear connection, the sensor pattern part of each of the second electrodes has a predetermined area necessary for detecting a position of the operation part, the sensor pattern part of the second electrode is provided in a shape of linear connection, the dummy pattern is short-circuited with only one of the sensor pattern part of the first electrode and the sensor pattern part of the second electrode, and within the predetermined range, with respect to an electrostatic capacity value between the sensor pattern part of the first electrode and the sensor pattern part of the second electrode, an electrostatic capacity value when the sensor pattern part is short-circuited with the dummy pattern is increased by 1.19% or less as compared with an electrostatic capacity value when the sensor pattern part is not short-circuited with the dummy pattern.

* * * * *